Figure 1:
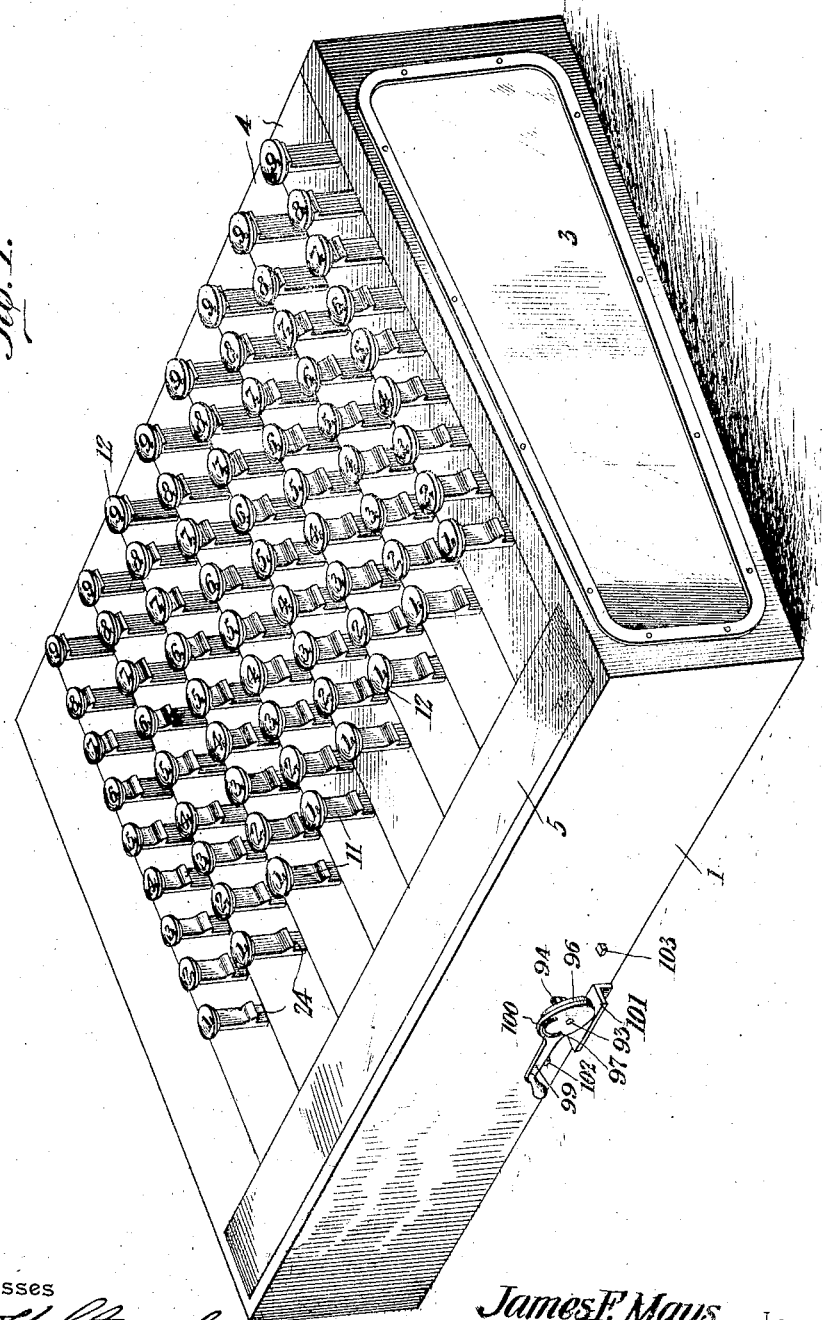

No. 838,128. PATENTED DEC. 11, 1906.
J. F. MAYS.
CALCULATING MACHINE.
APPLICATION FILED JULY 23, 1904.

6 SHEETS—SHEET 1.

Witnesses

James F. Mays Inventor by C.A. Snow & Co.
Attorneys

No. 838,122. PATENTED DEC. 11, 1906.
J. F. MAYS.
CALCULATING MACHINE.
APPLICATION FILED JULY 23, 1904.
6 SHEETS—SHEET 3.
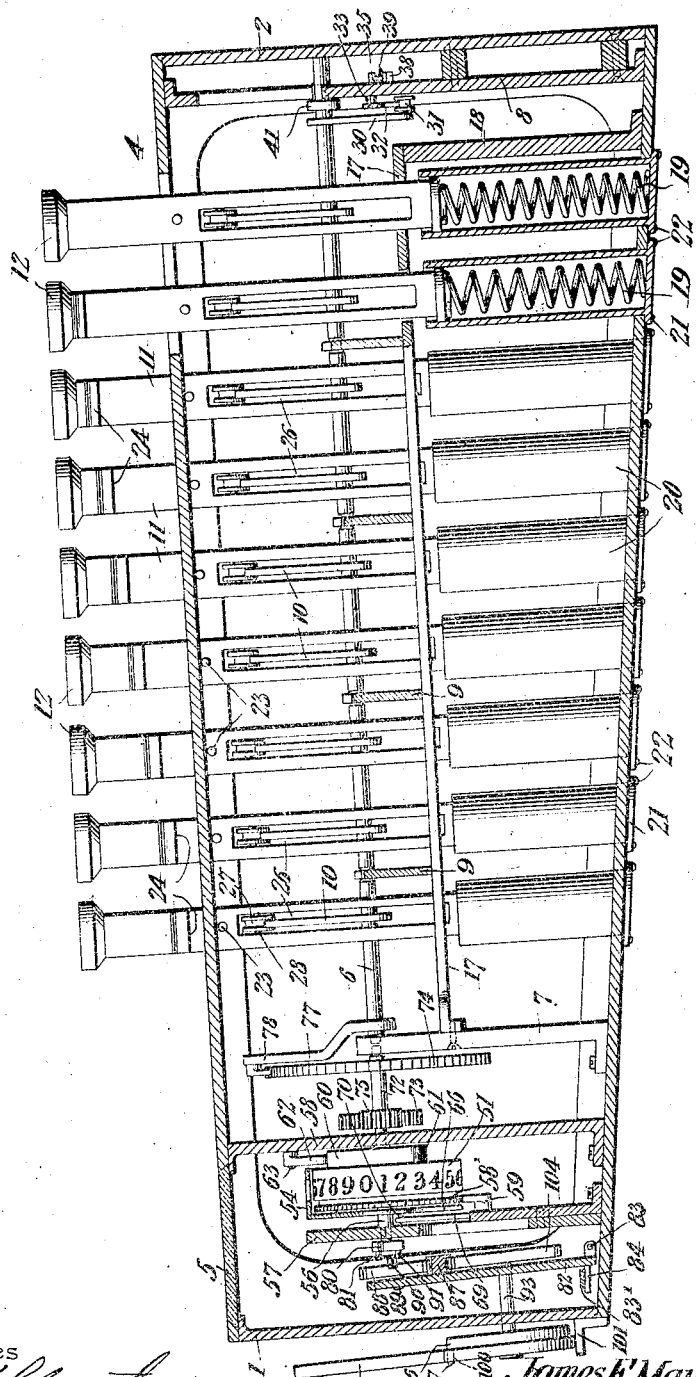
Fig. 3.
Witnesses
James F. Mays, Inventor
by 
Attorneys No. 838,128. PATENTED DEC. 11, 1906.
J. F. MAYS.
CALCULATING MACHINE.
APPLICATION FILED JULY 23, 1904.
6 SHEETS—SHEET 4.
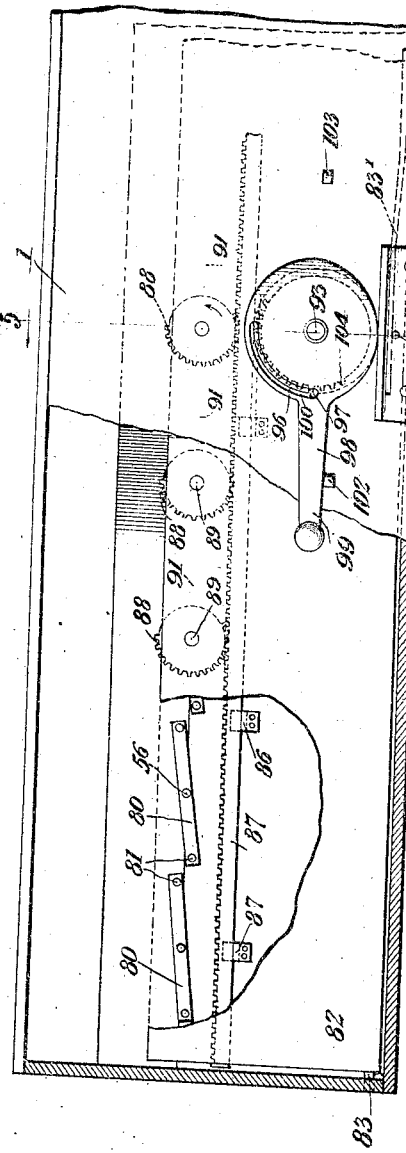
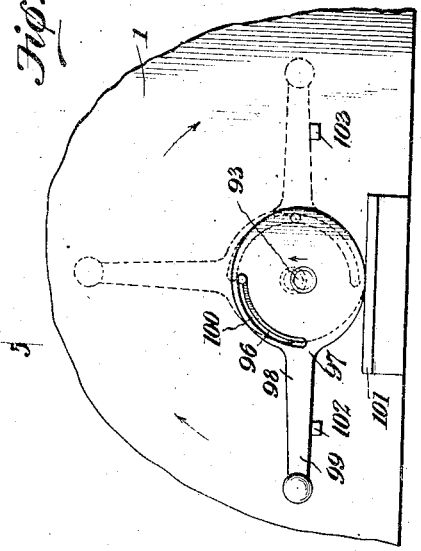
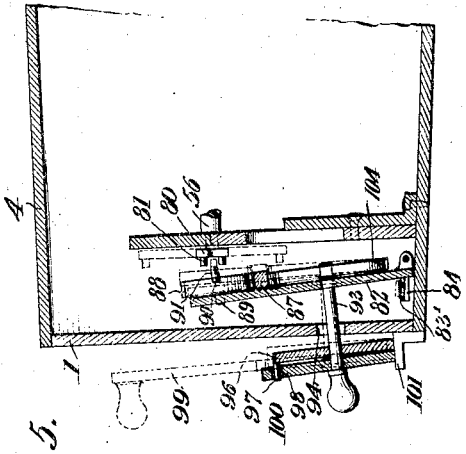
Witnesses
JamesF.Mays Inventor
by
Attorneys No. 838,128. PATENTED DEC. 11, 1906.
J. F. MAYS.
CALCULATING MACHINE.
APPLICATION FILED JULY 23, 1904.

6 SHEETS—SHEET 5.

Witnesses
James F. Mays Inventor
by C. A. Snow & Co.
Attorneys

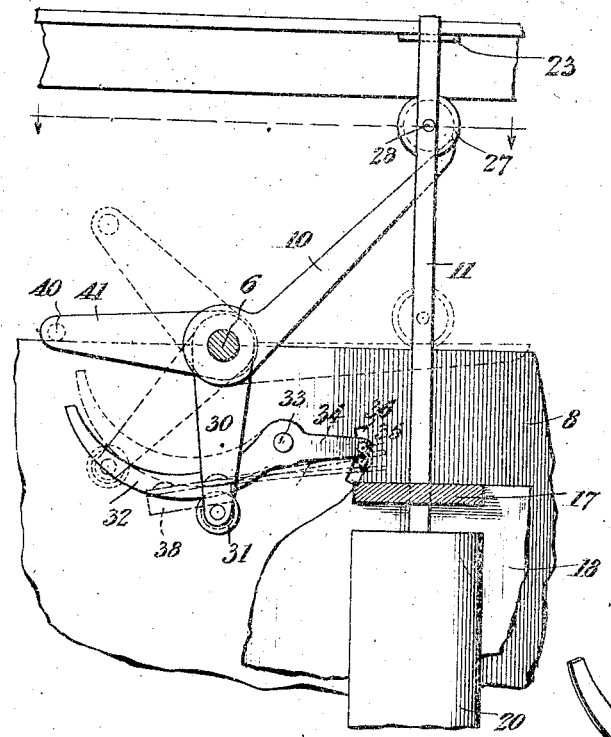
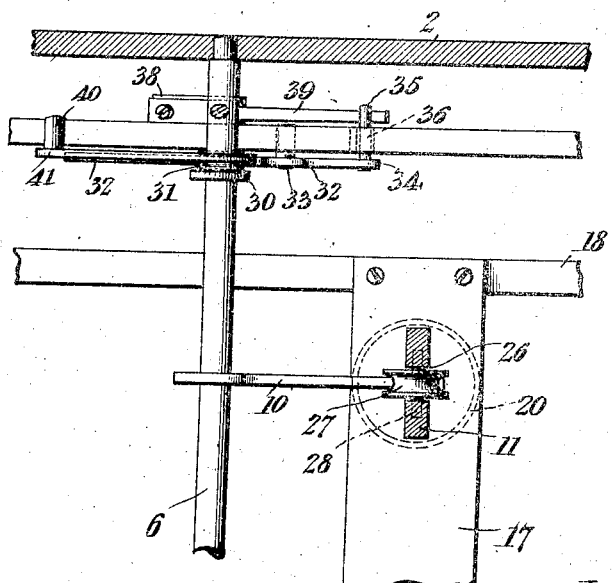

UNITED STATES PATENT OFFICE.

JAMES FRANCIS MAYS, OF BIRMINGHAM, ALABAMA, ASSIGNOR, BY MESNE ASSIGNMENTS, OF ONE-HALF TO SAID MAYS, AS TRUSTEE.

CALCULATING-MACHINE.

No. 838,128.    Specification of Letters Patent.    Patented Dec. 11, 1906.

Application filed July 23, 1904. Serial No. 217,851.

*To all whom it may concern:*

Be it known that I, JAMES FRANCIS MAYS, a citizen of the United States, residing at Birmingham, in the county of Jefferson and State of Alabama, have invented a new and useful Calculating-Machine, of which the following is a specification.

This invention relates to improvements in calculating-machines.

It is my object to provide such a machine with a plurality of registering devices which are severally operated by sets of keys, the movements of each device being determined by the value of the key depressed in its corresponding set. Each set of keys engages a rock-shaft, to which they impart rotary movements of varying degrees, which in turn are transmitted to the registering devices. By the provision of springs or equivalent means to effect a prompt return of each key to initial position after it has been depressed it will be evident that my machine may be operated like a type-writer, much time being saved by transmitting the registering movement direct from the keys to the indicating devices and avoiding the operation of levers or cranks to effect such registry as is the practice with the key-set machines now in general use. In addition to the speed thus gained and the fact that the operation of the keys may be carried on continuously without a stop my invention possesses great advantages in simplicity of construction and consequent cheapness of manufacture, which will be evident from a comparison with other similar machines.

Where a set of keys are required to impart varying movements to a transmission element against the action of spring means provided to return it to initial position, the power required to operate the several keys will vary with the increase in the spring tension as the element approaches the full limit of its travel. As this variable key resistance would materially interfere with the speedy operation of the machine, it is a further object of my invention to so construct and mount the various keys as to permit of a steady regular movement of uniform resistance for all keys without regard to the length of their stroke. This will insure the resistance to downward pressure being substantially the same at all points in the stroke of a key whether it be moved to the extent corresponding with a single unit or nine units.

With these and other objects in view, as will more fully hereinafter appear, the invention consists of the novel construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 2:
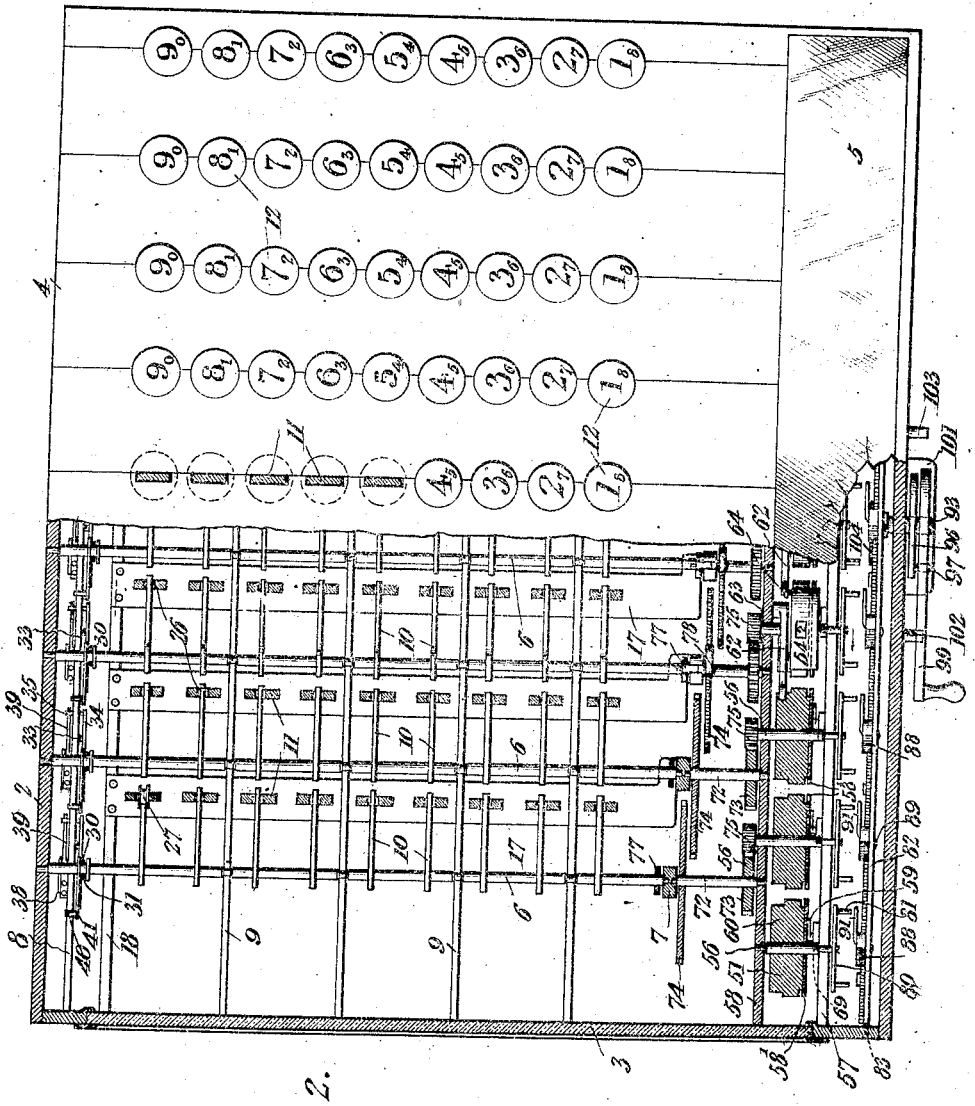
Figure 7:
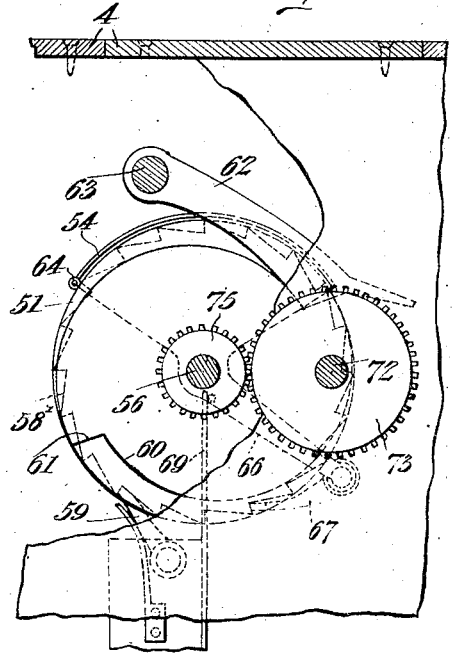
Figure 8:
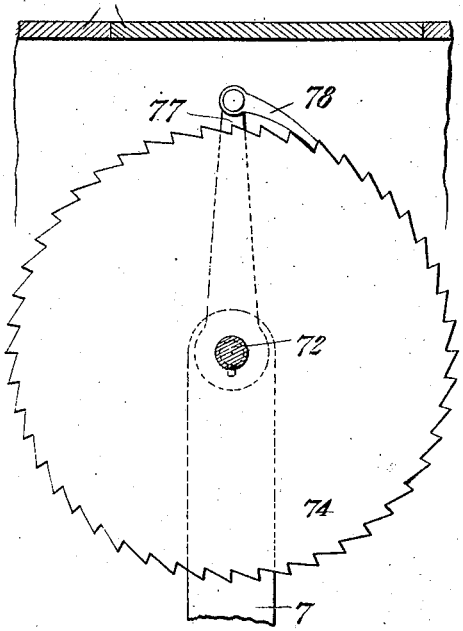
Figure 9:
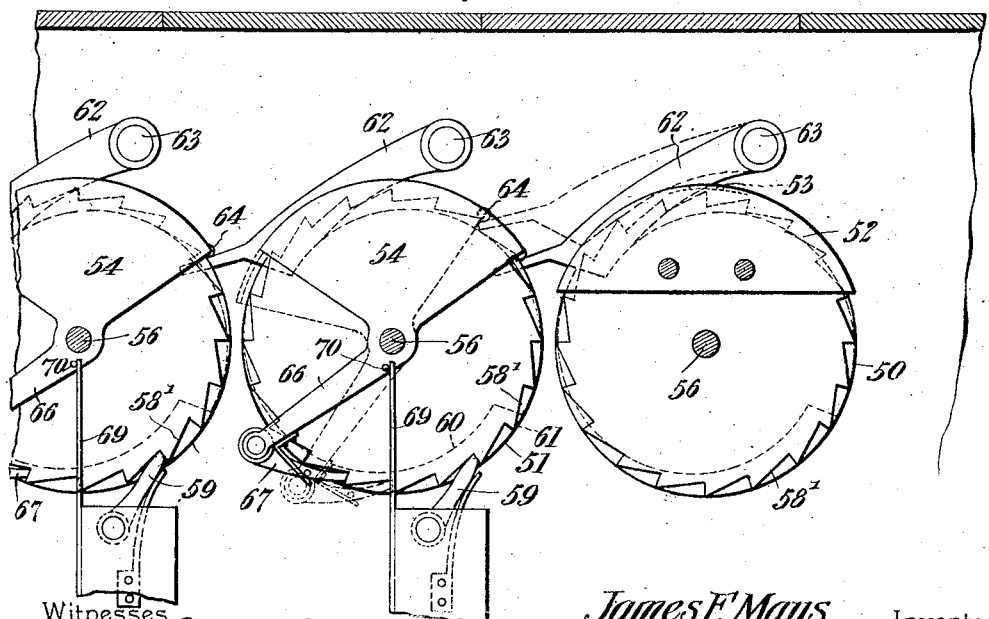

In the accompanying drawings, Figure 1 is a perspective view of an adding-machine constructed in accordance with the invention. Fig. 2 is a plan view of the same, portion of the mechanism being shown in section. Fig. 3 is a transverse sectional elevation of the machine. Fig. 4 is a detail view looking at the front of the machine, portions of the casing being broken away in order to more clearly illustrate the construction. Fig. 5 is a transverse sectional elevation of the front portion of the machine on the line 5 5 of Fig 4. Fig. 6 is a detail view of the manually-operated portion of the resetting mechanism, showing the dotted-line positions of the same. Fig. 7 is a sectional elevation of a portion of the mechanism looking from the rear toward the front of the machine and showing the multiplying-gearing between the main shafts and the registering-disks. Fig. 8 is an elevation of the ratchet mechanism for transmitting movement of each main shaft to one of the multiplying mechanisms. Fig. 9 is a view looking from the top of the machine, illustrating the units, tens, and a portion of the hundreds disks and illustrating particularly the construction and operation of the transfer mechanism. Fig. 10 is a transverse sectional elevation of a portion of the mechanism near the rear wall of the casing, showing the means for offering uniform resistance to the depression of the keys. Fig. 11 is a plan view of the same. Fig. 12 is a detail perspective view of the key-actuated cam lever detached.

Similar numerals of reference are employed to illustrate corresponding parts throughout the several figures of the drawings.

The device forming the subject of the present invention is one of that class of machines in which a separate operating-shaft is employed for each column of figures—that is to say, one shaft for the units-column, another for the tens-column, a third for the hundreds-column, and so on throughout the width of the machine—and there may be any desired number of columns by mere duplication of the parts and the capacity of the machine increased to an almost unlimited extent. In the present case eight columns of keys are used, the capacity of the machine running up to nine hundred and ninety-nine millions nine hundred and ninety-nine thousand nine hundred and ninety-nine, and as a matter of convenience the keys of the units and tens columns, which may be used to designate decimal values or cents, are preferably white, the hundreds, thousands, and tens-of-thousands columns are black, and the remaining two columns are preferably white, so that it will be a comparatively easy matter to select the proper column when a key is to be depressed.

The casing of the machine is generally rectangular, being somewhat lower at the front than at the rear, so as to present a slightly-inclined upper face, and the keys are so arranged that they all extend for the same distance from the upper face of the casing instead of being placed in stepped banks, it being found from experience that the former method leads to the most accurate and rapid operation of the machine.

The front wall 1, rear wall 2, and opposite sides 3 of the casing are preferably formed of metal frames holding transparent panels of glass, through which the working of all portions of the mechanism may be observed, so that in case of derangement of the parts it may be instantly detected. The top of the casing is formed of a plurality of thin metallic strips 4, extending within a short distance of the front wall, and from thence to the front of the casing is arranged a glass panel 5, through which may be observed the several registering or totaling disks, the disks being protected from dirt and dust, so that the numerals on the disks will at all times be clearly visible, and, if necessary, the glass may be of such character as to slightly magnify the numerals.

In the casing are arranged bearings for the support of a series of shafts 6, all of which are of the same construction, the shaft at the extreme right of the machine being employed for the operation of the units registering-disk, the next for the operation of the tens registering-disk, and so on throughout the width of the machine. The bearings for the several shafts are formed by plates 7 and 8, disposed, respectively, at points near the front and rear walls of the casing, and said shafts are further supported at intermediate points by cross-bars 9, each having approximately semicircular notches for the reception of the shaft, the wall at one side of the notch being continued up higher than that at the opposite side in order to prevent accidental displacement of the shafts. The opposite ends of each shaft are reduced in diameter, and the shaft is further provided with grooves throughout its length at points where the shaft is supported by the cross-bars 9, this construction serving to hold the shaft from displacement in the direction of its length. Each shaft is provided at frequent intervals throughout its length with rocker-arms 10, that are engaged by the keys, so that the depression of a key will cause a partial rotation of the shaft, the angular distance of such rotative movement being proportioned to the value of the numeral borne by the key depressed. In practice the extent of movement for each unit value is six degrees. If a key bearing the numeral "2" is depressed, the shaft will be revolved to the extent of twelve degrees, and so on up to the final number "9," the depression of a key bearing this digit serving to revolve the shaft to the extent of fifty-four degrees. Each shaft carries nine arms corresponding to the nine digits, and as the machine in the present instance has eight vertical rows of keys the total number of such keys is seventy-two.

The keys are all of the same construction, each including a shank portion formed of a bar rectangular in cross-section, and to the upper end of which is secured a finger-piece 12 in the form of a disk, the upper surface of which is hollowed or dished for the reception of the finger-tips, and on top of each finger-piece is one of the digits, those on the white keys, constituting the units and tens columns, being printed in black, those on hundreds, thousands, and tens-of-thousands columns, where the finger-keys are black, being printed in white, and the white keys of the remaining columns bear numerals printed in black. In addition to this each of the keys bears small numerals of a contrasting color running in reverse order to the arrangement of the digits and commencing at the "9" key with "0" and ending with the "1" key at "8." These digits, however, are used during subtraction and for other purposes, the larger digits in the center of the keys being employed when the machine is used for the ordinary purposes of addition.

The thin flat metallic shanks 11 of the keys are in part guided by the top 4 of the casing, and for this purpose said top comprises a plurality of strips of thin sheet metal extending in parallel relation across the top of the machine on lines parallel with the side walls of the strips, having one edge 14 for contact with the straight sides of one row of key-shanks and its opposite edge being provided with recesses 15 for the reception of the shanks of the next adjacent row. This forms a convenient means of assembling the parts and at the same time affords a practically dust-proof protection for the machine. At the lower portion of the casing each of the key-shanks is guided in a suitable opening formed in a bar or plate 17, supported at one end by the plate 7 and at the opposite end by a substantially vertical bracket 18, and under the bar or plate 17 are arranged elevating-springs of a number equal to the number of keys.

The springs 19 are helical in form, and each is arranged within a cylindrical casing 20. To the lower end of each of the cylinders 20 is secured a disk or plate 21, that fits under and is secured to the bottom of the casing by screws or similar fastenings 22, and said casing-bottom is provided with openings for the passage of the spring-carrying cylinders, so that, if necessary, any one or all of the cylinders may be readily removed from the bottom of the machine by loosening the securing-screws, thus facilitating repairs in the event of damage to the springs.

The keys, as above described, are arranged with their finger-pieces in a plane parallel with the plane of the upper inclined cover of the casing, so that all of the digits of the keys will be visible, and thus facilitate the selection of proper keys when the machine is being rapidly operated. Upward movement of the keys under the influence of springs 19 is stopped by small pins 23, extending through the key-shanks and adapted for engagement with the under side of the top of the casing. The downward movement of the keys is limited by shoulders 24, which practically form the lower edges of the finger-engaged disks, and as the keys of each row move, respectively, different distances the height of the shoulder from the top of the casing gradually increases from the key-bearing digit 1 to the key-bearing digit 9. The movement of the key is completed when the shoulder 24 strikes against the top of the casing, and it is then quickly released by the operator to permit its return under the influence of spring 19, it being here observed that the springs employed are only sufficient to insure the prompt return of the keys.

In the shank of each of the keys is arranged a longitudinal slot 26, through which the several rocker-arms extend, and in each slot is a small grooved roller 27, mounted on a pin 28, extending through the key-shank. The roller normally rests directly on the rocker-arm 10, and as soon as the downward movement of the key-levers commences the arm and shaft will be turned, the extent of movement depending on the digit carried by the key.

The angular movements imparted to the rock-shaft 6 are transmitted to the registering or totaling dials at the front of the machine; but before describing these connections attention is directed to the rear portion of the machine, where means are provided for insuring a smooth even stroke of the key of practically uniform resistance from the beginning to the end of the stroke without regard to the extent of depression. To each of the shafts 6 is secured a rocker-arm 30, having at its lower end an antifriction-roller 31, engaging the rounded lower surface of a cam-lever 32, that is pivoted on a pin 33, carried by the plate 8, there being one of such cam-levers for each of the shafts 6. The opposite end of the lever is in the form of a short arm 34, having a pin 35, which projects through a slot 36, formed in the partition, the curved walls of the slot being on lines struck from the center of the pivot-pin 33. To the face of the partition are secured small blocks 38, carrying leaf-springs 39, that bear against the inner sides of the pins 35 and tend to force the rounded cam-shaft of the levers 32 into engagement with the antifriction-roller 31. The curvature of the cam-lever 32 with respect to the arm 30 and shaft 6 is such that the cam under the influence of the spring 39 will tend to restore the arm 30 to its initial position. When this position is reached, further movement of the arm will be prevented by a stop-pin 40, carried by an arm 41, projecting from the rocker-shaft 6, the stop-pin moving into engagement with the top of the partition 8 and stopping the shaft at the same point after each operation.

In ordinary mechanisms employing springs where energy is stored for a return movement the construction is such that the greater the extent of such movement the greater will be the stress of the spring and the resistance to the movement will be increased in proportion to the distance traveled, this being highly objectionable on any key-operated machine, the lack of uniformity in touch preventing manipulation of the machine at high speed. In the present instance this difficulty is overcome by the provision of a lever so held by a spring that the stress of the spring will be substantially the same without regard to the extent of movement of the lever and without regard to the extent of movement of the finger-key, and the resistance offered by the spring on the depression of a key will be substantially uniform through the whole of the stroke whether the key depressed represents a one or two unit value or an eight or nine unit value.

The construction and mounting of the cam-lever 30 are such that a full stroke of a key, being equivalent to an angular movement of fifty-four degrees of one of the shafts 6 will result in moving the spring to the extent of less than one-fourth of an inch, and as the roller 31 is gradually moved outward it increases its distance from the fulcrum-point 33 of the lever, and the force exerted on the depression of a key will operate more effectively on the lever and spring. The resistance of the spring will of course increase in proportion to the extent of bending movement; but this is counterbalanced by the point of application of the power in the length of the lever, so that under all conditions the resistance offered on the depression of a key, no matter what the length of the stroke of the key, will be uniform, thus permitting a smooth and rapid operation of the machine.

The registering mechanism, which constitutes the subject-matter of a pending application, may be briefly described herein as comprising a number of totaling-disks 50 51, the disk 50 being the units-disk and the several disks 51 being the tens, hundreds, &c., disks, there being a disk for each row of keys. These disks are provided with a row of digits, preferably arranged in two sets running from "0" to "9," and are covered by shields 52 and 54, which are provided with a small slot 53, through which one of the digits on each of the disks may be observed through the glass cover 5 at the front of the machine. Each disk is rigidly mounted on a shaft 56, which shafts are mounted on bearings formed in transversely-disposed plates 57 and 58 at the front of the machine. Each of the disks carries a ratchet-wheel 58', having teeth corresponding in number with the digits on the disk and engaged by a spring-pressed pawl 59, fulcrumed to the frame and serving to prevent a reverse movement of the disk. A cam-disk 60 moves with each digit and is provided with two cam-surfaces terminating in shoulders 61, which surfaces engage a lever 62, pivoted to the partition 58 by a pin 63, raising and lowering it twice during each complete rotative movement of the disk. The shields 54 over the disks 51 are loosely fulcrumed on shafts 56 and are provided with a roller 64, which is adapted to be engaged by the lever resting upon the cam-disk movable with the disk of next lower in order. Each of these shields also has an arm 66, carrying a spring-pressed pawl 67, which engages the ratchet-teeth 58 and tends to move the digit-disk forward a carrying movement as the shield is moved by the adjacent cam-actuated lever 62. A spring 69 engages a pin 70 on each shield and acts to restore it to initial position after it has effected a carrying movement to its corresponding digit-disk, the latter being held against a return movement by the pawl 59. The several totaling-disks may be operated directly from the shafts 6; but in order to reduce the extent of key movement it is preferred to employ multiplying-gearing between the key-actuated shafts 6 and the disk-carrying shafts 56. To this end, therefore, the partitions 7 and 8 are provided with bearings for the reception of the shafts 72, each of which carries a gear-wheel 73 and a ratchet-wheel 74. The gear-wheel 73 intermeshes in a pinion 75 on the disk-carrying shaft 56, the gears being properly proportioned in accordance with the extent of movement of the key-shafts 6 and the diameters of the totaling-disks. To each of the shafts 6 is secured a rocker-arm 77, carrying a pawl 78 in engagement with the ratchet-wheel 74, this mechanism serving to transmit the rocking movement of the shaft 6 to the multiplying-gearing and the totaling-disk.

With the mechanism thus far described the depression of any key in any vertical column will effect rotative movement of the disk at the foot of that column to an extent dependent on the digit-key depressed, and, further, the transfer from disk to disk may be made so that the successively-increasing totals will be at all times visible through the glass panel 5, the arrangement of the rocking shields being such that the sight-openings in the latter will remain above a previously-exposed digit until the shield is allowed to move over the next digit.

The resetting mechanism, which also constitutes a part of the subject-matter of my other pending application, comprises a cross-bar 80, connected to the outer end of each shaft 56 and provided with pins 81. A plate 82, pivoted on pins 83 and held at an oblique angle by means of a spring 83', which engages a projection 84 thereon, carries clips 86, which support a rack-bar 87 in engagement with a plurality of mutilated gears 88. These gears are mounted on studs 89 and are provided with a groove 90 for the reception of a radially-disposed arm 91, which is adapted to engage with one or the other of the pins 81 only when the plate 82 is moved to its operating position. As a means for moving the plate and the rack-bar I provide a shaft 93, which passes through a slot 94 of the front wall of the casing and has secured to its outer end a disk 96, carrying a pin 97, and a second cam-disk 98, loosely fulcrumed on the shaft and having a crank 99, an arcuate slot 100, into which the pin 97 extends. The cam-disk rests on a small shelf 101 at the front of the casing, and under normal conditions the handle-crank 99 rests against a pin 102, projecting from the casing. To accomplish the resetting operation, the crank is turned upward to the right, and the cam-disk 98, bearing against the shelf 101, will raise the outer end of the shaft 93 and will throw the plate 82 rearward until all of the radial arms 91 are in the path of movement of the pins 81 of cross-bars 80. To accomplish this requires a movement of about eighty-one degrees, at which time that end of the slot 100 adjacent to the crank will engage the pin 97, and the movement then is continued until the crank is stopped by contact with the pin 103. During this latter portion of the movement the disk 96 is turned and the movement is transmitted through a gear 104, secured to the inner end of the shaft, to a rack formed on the bottom of rack-bar 87. The movement of the rack is transferred to all of the mutilated gears 88, and the radially-disposed arms 91 in turning will engage one or other of the pins 81 and restore the totaling-disks to zero position by the time the crank-lever is engaged with the pin 103. The crank is again moved to the left until it comes into contact with the pin 102. This moves the plate 82 outward until the arms 91 are out of the path of movement of the pins 81, after which the operator may proceed with another calculation.

With a mechanism of this class it is possible to perform all of the ordinary operations of adding, subtracting, multiplying, &c., and owing to the arrangement of the parts and the uniform resistance of the keys the machine may be manipulated both accurately and rapidly.

Having thus described the invention, what I claim is—

1. In a machine of the character described, the combination with a plurality of rows of depressible keys, of an indicating means for each row of keys, and means, operable by the keys of each row, which comprise oscillatory rock-shafts which turn on longitudinal axes and act to move the corresponding indicating means to an extent determined by the operated key, said keys and means being adapted to engage only during the depression of a key, and spring means to restore said parts to initial position.

2. In a machine of the character described, a plurality of rows of keys, an indicating means for each row of keys, means to transmit movement from the keys of each row to their respective indicating means, said means comprising an oscillatory member so mounted and disposed relatively to the keys that operate it that it presents a uniform resistance to their movements, and transmission means which bring said members and their respective indicating means into operative engagement during the movements of said members in one direction only.

3. In a machine of the character described, a plurality of spring-pressed keys, a plurality of spring-pressed oscillatory rock-shafts adapted to be engaged and moved in one direction for varying distances by different keys, an indicating-dial for each rock-shaft, and a dog-and-ratchet connection between each shaft and dial, as and for the purposes described.

4. In a machine of the character described, a plurality of sets of keys, an oscillatory rock-shaft for each set of keys adapted to be rocked thereby on a longitudinal axis to an extent determined by the operated key, spring means to return said shafts to initial position, indicating devices, and means to transmit movement from said rock-shafts to said indicating devices.

5. In a machine of the character described, a plurality of rows of keys, a plurality of oscillatory rock-shafts having longitudinal axes of rotation, each of which shafts is adapted to be rocked by the keys of a row to an extent corresponding with the value of the operated key, spring means to return the shafts to initial position, a set of item-wheels, one for each row of keys, and multiplying-gearing connecting said rock-shafts and wheels.

6. In a machine of the character described, a plurality of rows of keys, a plurality of rock-shafts provided with rocker-arms, the keys of each row being adapted to engage said arms and move a shaft to an extent determined by the operated key, and indicating devices, each of which is operatively connected to a rock-shaft and adapted to be moved thereby.

7. In a machine of the character described, a plurality of sets of keys, a rock-shaft operated by each set of keys, rocker-arms on said shafts, antifriction means to transmit motion from the keys to the rocker-arms of their respective rock-shaft to rock the latter to an extent determined by the operated key, indicating devices, and means to transmit movement from said rock-shafts to said indicating devices.

8. In a calculating-machine, a plurality of rock-shafts each having a series of rocker-arms, a row of finger-keys engaging said arms, means for limiting the stroke of the finger-keys in accordance with the values which they represent, and means for indicating the extent of rotative movement of the shafts.

9. In a calculating-machine, a plurality of rock-shafts, each having a series of rocker-arms, finger-keys having shanks, pins or antifriction-rollers carried by the key-shanks for engaging the arms, means for limiting downward movement of the keys in accordance with the values which they represent, and means at the front of the machine for indicating the extent of rotative movement of the shafts.

10. In a calculating-machine, a plurality of rock-shafts, each having a series of rocker-arms, finger-keys having shank portions, pins or antifriction-rollers carried by the shanks for engaging said arms, means for indicating the extent of rotative movement, and means connected to each shaft for resisting movement and for restoring the same to initial position.

11. In a calculating-machine, a plurality of rock-shafts, each provided at intervals with reduced portions, a plurality of transversely-disposed shaft-supporting bars having recesses for the reception of such reduced portions, rocker-arms on the shafts, finger-keys for engaging the rocker-arms, and means for limiting the extent of rotative movement of the shafts.

12. In a calculating-machine, a frame, a plurality of finger-keys having shanks, said keys being arranged in parallel rows, and a top formed of a plurality of independently-removable strips disposed between the rows of keys and of a width corresponding with the distance between two rows, said strips being notched at their abutting edges to provide openings through which said keys pass.

13. In a calculating-machine, a frame, a plurality of rows of finger-keys, and a plurality of separate strips forming the top of the casing and disposed between the rows of keys, said strips being independently removable without disturbing the keys or removing their finger-pieces.

14. In a calculating-machine, a frame, a plurality of finger-keys arranged in parallel rows, and a top formed of a plurality of strips each of a width approximately equal to the distance between two rows of keys, one edge of each strip being disposed in a straight line for engagement with the sides of one row of keys, and the opposite edge of each strip being recessed for the reception of the shanks of an adjacent row of keys.

15. In a calculating-machine, a casing, a plurality of finger-keys, shanks for said keys, indicating mechanism which engages said shanks at an intermediate point and is operated thereby, guides for the lower ends of said shanks, and spring means to return said keys to initial position which are carried by said guides, said guides being separately removable through openings in the casing.

16. In a calculating-machine, a casing having a bottom portion provided with a plurality of openings, finger-keys having shank portions in alinement with the openings, and spring-retaining boxes or tubes into which the shanks extend, said boxes or tubes forming spring-guides and being removable with the spring through the bottom openings.

17. In a calculating-machine, a casing, the bottom of which is provided with a plurality of openings, finger-keys having shank portions in alinement with said openings, cylindrical spring guiding and retaining casings extending through said openings and having flanged portions abutting against the bottom of the casing, and springs disposed within said retainers for resisting downward movement of the keys.

18. In a calculating-machine, a rock-shaft, a set of keys adapted to rock said shaft to varying extents according to the key depressed, and spring means to resist the rocking movement imparted by said keys, said means acting to present a substantially uniform resistance throughout the entire key-actuated travel of the shaft.

19. In a calculating-machine, a rock-shaft, a rocker-arm, a pivotally-mounted spring-pressed lever for resisting movement of the rocker-arm, the distance between the fulcrum of the lever and the point of connection between the arm and lever increasing in proportion to the resistance of the spring.

20. In a calculating-machine, a rock-shaft, a rocker-arm carried thereby, a pivotally-mounted lever with which the arm engages, and a spring acting on the lever and tending to resist movement of the arm, said arm and lever being slidably connected to increase the distance between the point of connection between the two and the fulcrum as the resistance offered by the spring increases.

21. In a calculating-machine, a rock-shaft, a rocker-arm carried thereby, and a spring-pressed cam-faced lever with which the arm engages, said lever having a curved portion following approximately the arc described by the end of the arm.

22. In a calculating-machine, a rock-shaft, a rocker-arm, an antifriction-roller carried thereby, a cam-lever pivoted at a point intermediate of its length and having its longer end mounted for engagement by the roller, and a spring acting on the shorter end of said lever and tending to resist movement of the lever and arm.

23. In a key-actuated machine, a movable member, and a spring-pressed cam-lever for resisting such movement, the connection between the member and the lever being adjustable, and the point of such connection gradually increasing from the fulcrum-point of the lever in proportion to the increasing resistance offered by the spring.

24. In a key-actuated machine, a key-actuated member, and a spring for resisting the movement thereof, there being a pivoted lever connection between the spring and the member, the distance between the fulcrum of the lever and the point of connection of the lever and member increasing as the resistance offered by the spring increases.

25. In a calculating-machine, the combination with a rock-shaft, a rocker-arm, of an antifriction-roller carried by the arm, a lever pivoted at a point intermediate of its length and having its longer arm curved for engagement by the roller, and a spring engaging the shorter arm of the lever and receiving the movement thereof.

26. In a calculating-machine, a plurality of rock-shafts, each having a series of rocker-arms, keys having shanks for engaging the rocker-arms, a pendent rocker-arm secured to one end of each shaft, and a spring-pressed lever having a curved cam-face with which the pendent rocker-arm engages.

27. The combination in a calculating-machine, of a plurality of rock-shafts each having a series of rocker-arms, finger-keys having shank portions engaging the rocker-arms, a spring tending to restore each rock-arm to initial position, and an auxiliary rocker-arm secured to each shaft and having a stop-pin for engaging a fixed portion of the machine.

28. In a calculating-machine, the combination with a plurality of rock-shafts each having a series of rocker-arms, a slotted partition arranged near the rear end of the machine and engaging the support for the shafts, finger-keys for engaging the rocker-arms, a pendent rocker-arm secured to each shaft, a cam-lever fulcrumed to the partition and having pins projecting through the slot thereof, a plate-spring supported by the partition and engaging the pin, an antifriction-roller carried by the pendent rocker-arm for engaging the cam-lever, and an auxiliary rocker-arm having a stop-pin for engaging the top of the partition.

In testimony that I claim the foregoing as my own I have hereto affixed my signature in the presence of two witnesses.

JAMES FRANCIS MAYS.

Witnesses:
J. L. YANCEY,
J. P. MAY.